Patented Feb. 21, 1939

2,147,751

UNITED STATES PATENT OFFICE 2,147,751

COCONUT PRODUCT AND PROCESS OF MAKING

Robert T. Northcutt, Cranford, N. J.

No Drawing. Application February 28, 1938, Serial No. 193,081

7 Claims. (Cl. 99—125)

In accordance with the present invention there is produced an improved food product which is suitable for use as filling for high-grade candies and confectionery, as a vegetable shortening, or the like.

More specifically, the present invention provides a novel coconut product which is in the form of a homogeneous fatty or oily mass wherein the oil present in the coconut is in the continuous phase and the solids and water are in the disperse phase, which presents a homogeneous, free-flowing mass at temperatures above the melting point of the coconut fats, which passes immediately into a complete emulsion upon the addition of water, which is completely non-rancidifiable, which has substantially a butter-like consistency at normal room temperatures, and which may be used as an economical shortening agent, replacing animal shortenings, and which also forms a markedly improved filling for high-grade candies and other confectionery.

The present invention comprises the above-indicated product and the process of producing the same. The application is a continuation-in-part of my application, Serial No. 124,666, filed February 8, 1937.

It has for many years been a prime object of the coconut trade to produce a coconut paste free from the woody character of the coconut. It has been particularly desired to produce such a paste which would be meltable and also readily emulsifiable in water. Such a product has been unknown heretofore, and has been the subject of extensive investigation and experimentation by this inventor.

In carrying out these investigations, fresh coconut meat was ground in a colloid mill until the cellulose and other insoluble material had been reduced to a very much finer state than when prepared for spray-drying, with the thought that this more finely disintegrated material when sprayed would furnish the desired type of material, that is, a product which would disperse homogeneously in milk or water and would disperse throughout any candy or bakery mass; but upon trial, it was found that however fine the coconut meat (which is a natural emulsion of oil, water, and viscous material) was ground, the material when dehydrated, whether by spray-drying or otherwise, would not again go into emulsion, but would float substantially as separate particles when violently agitated in milk, water, or other liquid.

It was thought that this was due to the particles of the coconut meat not having been sufficiently finely comminuted and it was decided to regrind the material in a hammer mill and then add water and re-spray so as to get a still finer sprayed mass, and while preparing to do this, it was noticed that after grinding a quantity of the material, the warm water used to wash the mill formed a perfect emulsion with the material left in the mill from the above-mentioned grinding; also, that when some of the comminuted mass was dropped into water or other aqueous liquid having a temperature of 75° F. or above, a perfect emulsion instantly resulted with substantially no agitation, the dried mass when crushed or ground, forming an oily mass plastic and soft above 75° F., from which free oil was substantially absent, that is, there was no separation of oils from the other solids.

The above observations led to the following discovery: In any emulsion composed of gum-water-oil, dehydrated by spray-drying or otherwise, the resulting mass consists of minute subdivisions of oil covered with a protecting film of the viscous agent, and the material is not plastic and will not melt at any temperature even though it be heated to several hundred degrees above the melting point of the fats; but if this protecting film should be broken up by grinding, crushing or rubbing, then the subdivided oil will coalesce and the mass will be plastic, softening and melting at the melting temperature of the fats. Experiments indicate that this mass is also an emulsion but with the phases reversed from their original relationship. In other words, it is a water-in-oil emulsion, with the oil in continuous phase, the water in disperse phase, and the solid particles suspended throughout the mass in the oil.

In applying this discovery to coconuts, it was learned that the production of such a water-in-oil emulsion of coconut paste depended on reducing the coconut meat or copra to or below a critical point of moisture content before it was ground. Unless the copra is dehydrated to below that critical point before grinding, the desired meltable paste cannot be produced, but only a waxy substance results which will not melt regardless of heat but will only dry and char.

It was learned by experiment that the critical moisture content varies over a relatively narrow range, depending on the individual coconuts. A good average value is 6% of water. A more reliable figure is 4%, but, for some nuts the critical point may be as high as about 9%. To produce the product of this invention it is necessary only that the copra be dehydrated below the critical point. By "substantially anhydrous" in the claims it is meant that the product contains less water than this critical percentage. By "substantially dehydrating" in the claims is meant drying to below this critical moisture content. It is not necessary that the product be completely anhydrous. No appreciable advantage would be gained thereby, and the cost would be greatly increased. However, such a product is clearly within the scope of this invention.

In this connection, it is observed for example, that if dried coconut meat containing say six percent moisture is ground in a hammer mill with a hammer speed of 14,000 feet per minute, the moisture content of the product will be only about three per cent, owing to the fact that a portion of the moisture has been used in hydrating the proteins and this hydrated protein will not again give up this moisture, formerly removable without difficulty. Since, as pointed out above, the moisture content before grinding will not be higher than 9%, the maximum moisture content of the paste will not be above about half that figure, in other words, about 5%. Apparently this feature is important in connection with the non-rancidifying nature of the paste of this invention, as the normal moisture content of the copra before grinding, as much as six or eight per cent., if present and active in the paste, would tend to aid rancidifying, while this normal moisture after becoming a part of the protein molecule, is inactive as a rancidifying agent. Another possible explanation of this phenomenon is that there must be an anti-oxydant in he coconut itself which is released or formed by the grinding under the particular conditions of this invention. However, whatever may be the explanation, the present product produced in the above-indicated manner will keep indefinitely long in an open container without showing the slightest sign of rancidity, whereas, if the material is merely crushed instead of violently disintegrated, rancidity will occur within a few weeks or months if left exposed to air or moisture. Samples have been kept open for upwards of four years without any rancidifying, and even if any free oil separates out, that too remains sweet and non-rancidifying.

In carrying out the process it is noted that the character of the comminution of the coconut meat is of importance. Mere grinding such as is used in producing peanut-butter or almond paste will not reduce coconut to a paste at all, but will leave relatively large crushed masses of fiber-solids material as one phase and free oil as the other phase. Moreover, it requires large amounts of power to produce the production of the coconut paste of the present invention, there being required as much as from ten to twenty times that needed for the production of peanut-butter, almond paste, or other nut pastes and the comminution must be performed between very definite temperature ranges, namely, the melting point of the coconut fats (approximately 75° F.) and the scorching point of coconut sugars and proteins (approximately 145° F.)

Further, it appears that the shearing action of a hammer mill rather than a crushing action such as is obtained in a jaw-crusher or pebble mill, is an important factor in the production of the improved product, although other mills such as ball mills and plate mills can be utilized to produce the same product. It would be expected, moreover, that the obvious and conventional way to produce the present improved product would be to comminute the soft fresh coconut meat and then dry the resulting mass, instead of first drying the meat to a tough, hard mass, and then grinding this hard mass, which in addition to being resistant to grinding is sensitive to heat and resistant to melting. The expectation would be that, so far as concerns the final product, either procedure would produce essentially the same product, with the assumption that while the undried nut ground product might be coarser when dried, the general characteristics of either product would be approximately the same.

However, such is not the case, and in the handling of a natural or artificial emulsion of oil-gum-water, a very definite physical difference results from variation of the order of the grinding and dehydration steps. Wet grinding of emulsions, followed by drying, results in a continuous gum-solid-oil body in which the oil is the disperse phase, whereas drying first and then grinding produces a product where the oil is the continuous phase and the solids are the disperse phase, in other words, there is produced a complete reversal of the phases governed by the order of the drying and grinding steps. The present improved product, that is, a coconut paste as a homogeneous mass is not produced by the ordinary means of crushing the nut-meat as in the production of peanut butter or almond paste, where simple crushing in a meat chopper or any convenient grinding apparatus will give satisfactory results. The ordinary nuts have a soft cellulose-solid body, whereas coconut has an extremely resistant structure as is shown by the fact that long threads may be dried, producing tough and substantial structures several inches long and upwards of a sixteenth of an inch in diameter.

In producing the product of this invention either fresh coconut meat or copra may be utilized. In either case, the material should first be cleaned of the outer skin or film. Any rancidity present should be neutralized by some means such as treatment with a weak alkali. The material is then preferably reduced to suitable sizes to facilitate drying, for example, into slices about one-eighth of an inch in thickness, or into chips of approximately the same thickness. These are dried at a temperature of not more than approximately 160° F., preferably with the aid of large quantities of air to carry away the evaporated moisture. From one to four hours are required usually for the drying operations, the drying being continued until the moisture content of the nut meat is sufficiently low, preferably not more than approximately six per cent., the drying time depending upon size of particles, temperature and volume of the air. Obviously, if copra is used as the starting material, the drying time will be reduced, inasmuch as the moisture content of copra is only 12–16%, as opposed to the 50% or more of water in fresh coconut. However, considerable time will still be needed, for it is much easier to dehydrate coconut meat to 12% moisture than below 12%. After it is sufficiently dehydrated, it is ground in a suitable mill to the desired consistency. For the sake of illustration, a mill having the specification given in the following paragraphs will be found to give excellent results.

The dried material is fed into a hammer mill the rotor of which is eighteen inches in diameter and is traveling at from around 3,000 to 3,600 R. P. M., giving from 12,000 to 14,000 feet per minute speed of the hammers. Such a rotor six inches wide will properly mill approximately 180 pounds of dried material per hour, provided that it is driven with a twelve to fifteen horsepower motor. The mill is provided with a screen outlet, having one-sixteenth of an inch diameter perforations.

Starting at room temperature, the material will go through the mill and will be discharged as a waxy, non-melting, non-oily appearing mass with a relatively coarse particle size. When approximately twenty-five pounds of the material have passed through the mill, there is observed that there has been a warming up of the material, a gradually decreasing particle size and a gradually increasing oily appearance until the product becomes stabilized as a free-flowing mass which continues indefinitely.

In order to avoid the formation of the initial waxy, non-melting mass, it is desirable that the mill be heated to around 100° F. before the material is introduced, and also that the material shall be above the melting point of its fats. With these precautions, the stable, homogeneous, free-flowing, semi-liquid product of the present invention is produced immediately, while if the operation is started without previously heating the mill and material, the first output of the mill must be rejected until the heat resulting from the grinding operation raises the temperature of the mill and mass to the proper point to produce the new stabilized product described above.

Care must be taken that the temperature of the mill and its output does not rise above 160° F. as the maximum, and preferably not above 140°–150° F., in view of the fact that overheating of the product causes discoloration thereof, and the above indicated limits constitute the maximum temperatures which are compatible with safety as otherwise the material flowing from the mill will be so hot that when placed in containers the long-continued heat before cooling will cause discoloration; but if the temperature of the milling operation is not allowed to exceed say 140° F., as indicated above, the product remains snow-white.

The speed and size of the mill and screen can be varied to produce virtually any desired consistency in the product, varying from a thick coarse paste to one so fine as to almost liquid in its melted state. The specific directions given above will result in a paste having a consistency much like a white chocolate, hard and flaky below 70° F. but resembling soft butter when slightly above room temperature. It will be non-rancidifying. When water is added thereto, it will readily emulsify therein to a milky consistency. However, if it is then dehydrated, it will not return to its former state, but on the contrary will not melt but will instead dry and char. It will also rancidify very readily. If, however, it is dehydrated and then reground, it will resume its former meltable state.

In the event that variations in the fat-solid content of the nuts cause at times oil separation from the milled mass, the oil may be caused to return by the addition of one per cent.–two per cent. of glycerin or water, and thorough mixing, so that the water combines with the water solubles and acts to re-emulsify the free oil. This constitutes an important feature of the process, enabling a standard product to be produced from all types of nuts. Ethylene glycol may be used instead of glycerin for this purpose, or an alcohol-water mixture containing approximately 25% by volume of alcohol and 75% by volume of water may be used provided the water-soluble components of the ground mass are soluble in the mixture.

It has been mentioned above that the present product is suitable as a shortening material as well as a filling for confectionery. The flaky effect of shortening is obtained by securing a so-called "folded in" effect, which is produced by a discontinuous distribution of the shortening agent. In the present instance, with the use of the coconut paste of the present invention as the shortening agent, this effect is obtained because the separate particles of the product tend to shorten the dough mass unequally due to the fact that the minute particles retain an oil content which is richer than that between the particles.

It may be noted also in connection with the preparation of the product of the present invention that the particle size and the rate of feed are dependent upon the area of the screen of any given mill and the size of the perforations through the screen, and a variation of even ten pounds per hour above the proper capacity of any screen in the feeding of the mill will cause excessive oil separation or scorching, while if the feed should be too slow, the product will be waxy. Likewise, if the perforations are too large, or the mill speed too slow, the product will be waxy; whereas if the mill speed is too high, or the perforations too small, or the mill screen surface too small, the product tends to separate its oil, or scorch, or both.

It will be understood, of course, that various details in the carrying out of the invention as described above may be modified in various ways as may become apparent to one skilled in the art without departing from the spirit and scope of the invention, and that therefore it is intended and desired to embrace within the scope of this invention such modifications and changes as may be necessary to adapt it to varying conditions and uses; and it is to be understood also that the following claims are intended to cover all of the generic and specific features of the invention as herein described, and all statements of the scope of the invention which as a matter of language might be said to fall therebetween.

Having thus described my invention, what I claim as new and desire to secure by Letters Patent is:—

1. A substantially anhydrous coconut paste comprising the fats and oils of the coconut with the solid substances of the nut suspended therein in a finely divided condition, having a melting point of approximately 75° F. and forming when melted a free-flowing mass of uniform consistency.

2. As a food product, an emulsion comprising in continuous phase the oils and fats of coconuts, and in disperse phase not more than 5% of water, the solid particles of the nuts being suspended therein in finely divided condition.

3. The process of producing a coconut paste, which comprises drying whole coconut meat to a moisture content of below approximately 9%, and comminuting the said dried meat at a temperature between the melting point of the coconut fats and the scorching point of the coconut sugars and proteins.

4. The process of producing a coconut paste, which comprises drying copra to a moisture content of below 9%, and comminuting the resulting material while maintaining the temperature above approximately 75° F. and below approximately 160° F.

5. The process of producing a coconut paste, which comprises drying whole coconut meat under non-scorching drying temperatures until its moisture content is below approximately 9%, and comminuting the resulting dried product in a hammer mill at temperatures between the melting point of coconut fats and the scorching point of coconut sugars and proteins to a free-flowing, uniform consistency.

6. The process of producing a coconut paste, which comprises drying whole coconut meat under non-scorching drying temperatures until its moisture content is below approximately 6% and communiting the resulting dried product in the presence of an alcohol in a hammer mill at temperatures between the melting point of coconut fats and the scorching point of coconut sugars and proteins.

7. The process of producing a coconut paste, which comprises drying whole coconut meat at a drying temperature not exceeding approximately 160° F., to a moisture content of below approximately 9%, feeding the resulting dried meat into a hammer mill under conditions proportioned such that the rate of feed is approximately 180 pounds per hour with a mill rotor substantially six inches wide, eighteen inches in diameter, and having a speed of from approximately 3000 to 3600 R. P. M., and maintaining the milling temperature at between approximately 75° F. and approximately 140° F., thereby producing a free-flowing homogeneous coconut paste which is substantially completely and instantly emulsifiable in water.

ROBERT T. NORTHCUTT.